(12) United States Patent
Zhai et al.

(10) Patent No.: US 11,503,926 B2
(45) Date of Patent: Nov. 22, 2022

(54) SHOPPING SHELF

(71) Applicant: SHANGHAI CLOUDPICK SMART TECHNOLOGY CO., LTD., Shanghai (CN)

(72) Inventors: Hengliang Zhai, Shanghai (CN); Linan Feng, Shanghai (CN); Wenyao Wu, Shanghai (CN); Jieyu Ma, Shanghai (CN); Ding Xia, Shanghai (CN); Tingtao Li, Shanghai (CN); Yimei Zhang, Shanghai (CN)

(73) Assignee: Shanghai Cloudpick Smart Technology Co., Ltd., Shanghai (CN)

(*) Notice: Subject to any disclaimer, the term of this patent is extended or adjusted under 35 U.S.C. 154(b) by 0 days.

(21) Appl. No.: 17/071,859

(22) Filed: Oct. 15, 2020

(65) Prior Publication Data

US 2021/0030169 A1  Feb. 4, 2021

Related U.S. Application Data

(63) Continuation of application No. PCT/CN2019/083317, filed on Apr. 18, 2019.

(30) Foreign Application Priority Data

Apr. 19, 2018 (CN) .......................... 201810356166.5

(51) Int. Cl.
*A47B 96/00* (2006.01)
*A47F 5/00* (2006.01)
*A47B 96/06* (2006.01)

(52) U.S. Cl.
CPC .......... *A47F 5/0006* (2013.01); *A47B 96/061* (2013.01)

(58) Field of Classification Search
None
See application file for complete search history.

(56) References Cited

U.S. PATENT DOCUMENTS

| 6,290,075 B1 * | 9/2001 | Cheimets ............. A47B 46/005 |
| | | 211/183 |
| 9,129,245 B2 | 9/2015 | Chudy et al. |
| 10,121,121 B1 * | 11/2018 | De Bonet .............. A47B 57/34 |
| 10,466,095 B1 * | 11/2019 | O'Neill .................. G01G 19/42 |
| 10,732,026 B1 * | 8/2020 | Danenberg ........... H01R 13/514 |

(Continued)

FOREIGN PATENT DOCUMENTS

| CN | 2616138 Y | 5/2004 |
| CN | 1575696 A | 2/2005 |

(Continued)

OTHER PUBLICATIONS

International Search Report to PCT Application No. PCT/CN2019/083317 dated Jul. 3, 2019, (8p).

(Continued)

*Primary Examiner* — Steven M Marsh
(74) *Attorney, Agent, or Firm* — Arch & Lake LLP

(57) ABSTRACT

The disclosure provides a shopping shelf. The shopping shelf includes: a shelf support; and a rack detachably mounted to the shelf support; where the rack includes: a mounting bracket; a weight sensing device above the mounting bracket; a suspension bracket base above the weight sensing device; and a suspension bracket having one end detachably mounted to the suspension bracket base.

15 Claims, 8 Drawing Sheets

(56) References Cited

U.S. PATENT DOCUMENTS

| | | | |
|---|---|---|---|
| 10,809,122 B1* | 10/2020 | Danenberg | G01G 21/08 |
| 11,125,607 B1* | 9/2021 | Justice | G01G 19/42 |
| 2009/0255292 A1 | 10/2009 | Benz | |
| 2014/0201041 A1 | 7/2014 | Meyer | |
| 2014/0201042 A1* | 7/2014 | Meyer | G01G 19/413 |
| | | | 705/28 |
| 2015/0012396 A1 | 1/2015 | Puerini et al. | |
| 2015/0127496 A1 | 5/2015 | Marathe et al. | |
| 2016/0048798 A1* | 2/2016 | Meyer | G01G 19/42 |
| | | | 705/28 |
| 2016/0187189 A1 | 6/2016 | Camp | |
| 2017/0249587 A1 | 8/2017 | Jones et al. | |
| 2020/0275775 A1* | 9/2020 | Marriott | B25H 3/04 |

FOREIGN PATENT DOCUMENTS

| | | |
|---|---|---|
| CN | 201492123 U | 6/2010 |
| CN | 101989333 A | 3/2011 |
| CN | 203693111 U | 7/2014 |
| CN | 204883802 U | 12/2015 |
| CN | 105314315 A | 2/2016 |
| CN | 106355368 A | 1/2017 |
| CN | 106454733 A | 2/2017 |
| CN | 106845962 A | 6/2017 |
| CN | 106920152 A | 7/2017 |
| CN | 106923575 A | 7/2017 |
| CN | 106934692 A | 7/2017 |
| CN | 107403332 A | 11/2017 |
| CN | 107480735 A | 12/2017 |
| CN | 107481414 A | 12/2017 |
| CN | 108332829 A | 1/2018 |
| CN | 207236552 U | 4/2018 |
| CN | 108652332 A | 10/2018 |
| JP | S5964073 U | 4/1984 |
| JP | H0650557 U | 7/1994 |
| JP | H0767753 A | 3/1995 |
| JP | 3213696 B2 | 10/2001 |
| JP | 2005040211 A | 2/2005 |
| JP | 2005231772 A | 9/2005 |
| JP | 3837475 B2 | 10/2006 |
| JP | 2007061407 A | 3/2007 |
| JP | 2008043542 A | 2/2008 |
| JP | 2008272012 A | 11/2008 |
| KR | 20140136089 A | 11/2014 |
| WO | WO-2019220400 A1 * | 11/2019 ............ G01G 19/42 |

OTHER PUBLICATIONS

First Office Action issued to Chinese Patent Application No. 201810356166 5 dated Mar. 4, 2020 with English translation, (19p).
Australian Examination Report issued to Australian Application No. 218405073 dated May 18, 2021, (6p).
Australian Examination Report issued to Australian Application No. 2019254319 dated May 20, 2021, (8p).
Extended European Search Report issued in EP Application No. 18902476.3 dated Feb. 19, 2021, (13p).
Extended European Search Report issued in EP Application No. 19788019.8 dated May 11, 2021, (7p).
Decision to Grant of Japanese Patent Application No. 2020-556770 dated Jan. 18, 2022, (5p).
Chinese Office Action issued in Chinese Application No. 2018100795187, (2p).
Korean Office Action issued in Korean Application No. 10-2020-7009712 dated Jun. 25, 2021, (10p).
Korean Office Action issued in Korean Application No. 10-2020-7029118 dated Feb. 21, 2022, (69p).
PCT Search Report of International Application No. PCT/CN2018/117327 dated Feb. 27, 2019, (8p).

* cited by examiner

SHOPPING SHELF

This application is a continuation application of International Patent Application No. PCT/CN2019/083317 filed on Apr. 18, 2019, which claims priority to Chinese Patent Application No. 201810356166.5 filed on Apr. 19, 2018, the entire contents of which are incorporated herein by reference for all purposes.

FIELD

The disclosure relates to goods storage apparatus for retail industry, particularly, a shopping shelf.

In the traditional shopping mode of the retail industry, every supermarket or convenience store needs specialized salesmen and cashiers, and the labor cost is high. With the development of electronic payment technology, identity recognition technology and cloud computing technology, unmanned supermarket projects have high feasibility in technology. In the unmanned supermarket project, a basic problem to be solved urgently is the problem of determination and recording of the goods purchased by the user, and specifically, the server needs to accurately determine the goods which are selected, put back, and taken from the supermarket by each user.

In the prior art, the goods purchased by a user may be determined with camera technology. But this method requires calculating a large amount of data, which causes a high data processing cost. And this method has large errors in goods recognition which may be caused by the user to fool the camera, resulting in the loss of the goods. The goods purchased by a user may be determined with RFID reader in the entrance/exit of the supermarket or convenience store. And every item of the goods is arranged with a RFID tag which requires high costs, resulting in the high price of the goods. In addition, if a user eats the edible goods before leaving the store and leaves the package in the supermarket, the RFID reader cannot sense and determine the real consumption amount of the user, and this kind of unmanned supermarket has a high operational risk.

SUMMARY

According to a first aspect of the disclosure, there is provided a shopping shelf, including: a shelf support; and a rack detachably mounted to the shelf support; where the rack includes: a mounting bracket; a weight sensing device above the mounting bracket; a suspension bracket base above the weight sensing device; and a suspension bracket having one end detachably mounted to the suspension bracket base.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description, in which.

DETAILED DESCRIPTION

Figure 1:
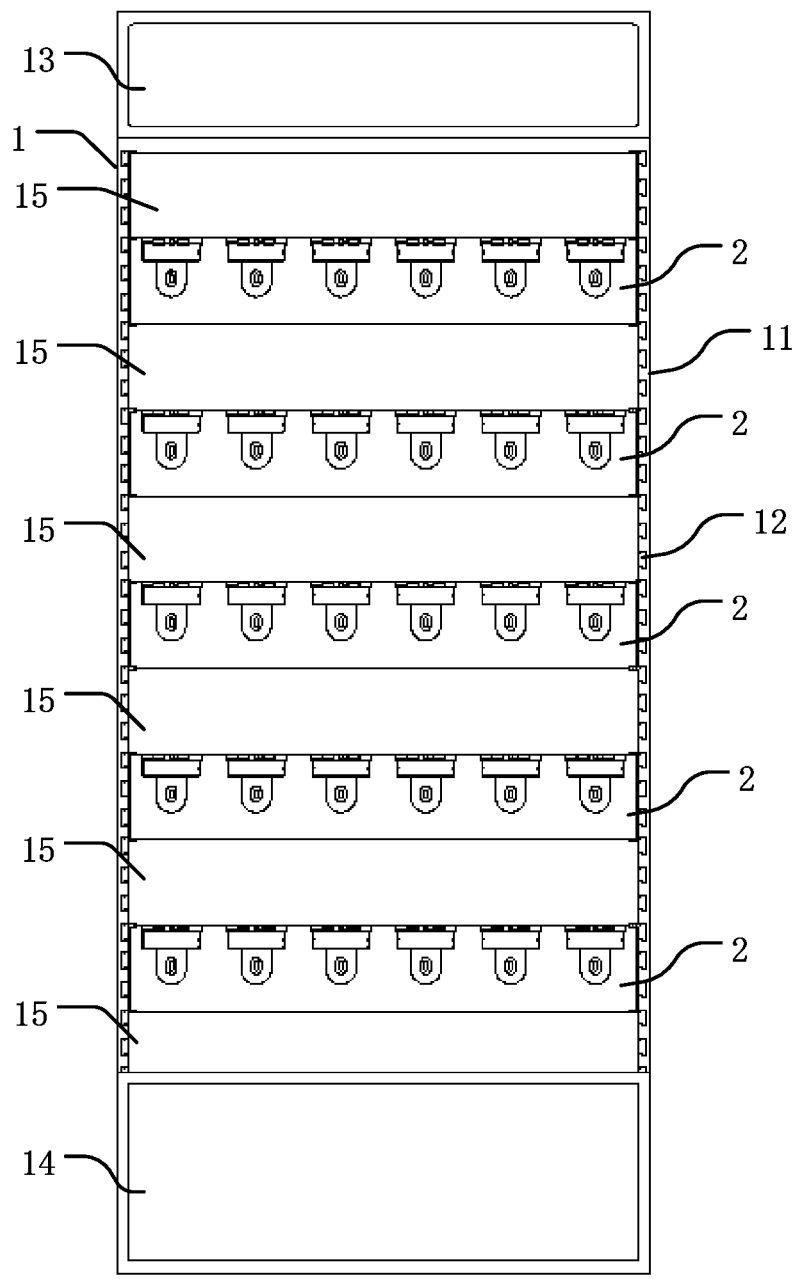
FIG. 1 is a schematic view of a whole shopping shelf according to an example of the disclosure.

Examples will be described in detail herein with the illustrations thereof expressed in the drawings. The implementations described in the following examples do not represent all implementations consistent with the present disclosure. On the contrary, they are examples of an apparatus and a method consistent with some aspects of the present disclosure. In the drawings, elements having the same structure are denoted by the same reference numerals, and elements having similar structures or functions are denoted by similar reference numerals.

The terms representing directions mentioned in the present disclosure, for example, up, down, front, back, left, right, inside, outside, top surface, bottom surface, side, top, bottom, front, rear, end, etc., mean the directions in the drawings, and they are only used to explain and illustrate the present disclosure, but not to limit the scope of the present disclosure.

When an element is referred to as being "on" another element, it can be directly on the other element; there may also be an intermediate element, the element being disposed on the intermediate element and the intermediate element being disposed on the other element. When an element is referred to as being "mounted to" or "connected to" another element, it is to be understood that the element is directly "mounted to" or "connected to" the other element or that the element is indirectly "mounted to" or "connected to" the other element through an intermediate element.

Figure 2:
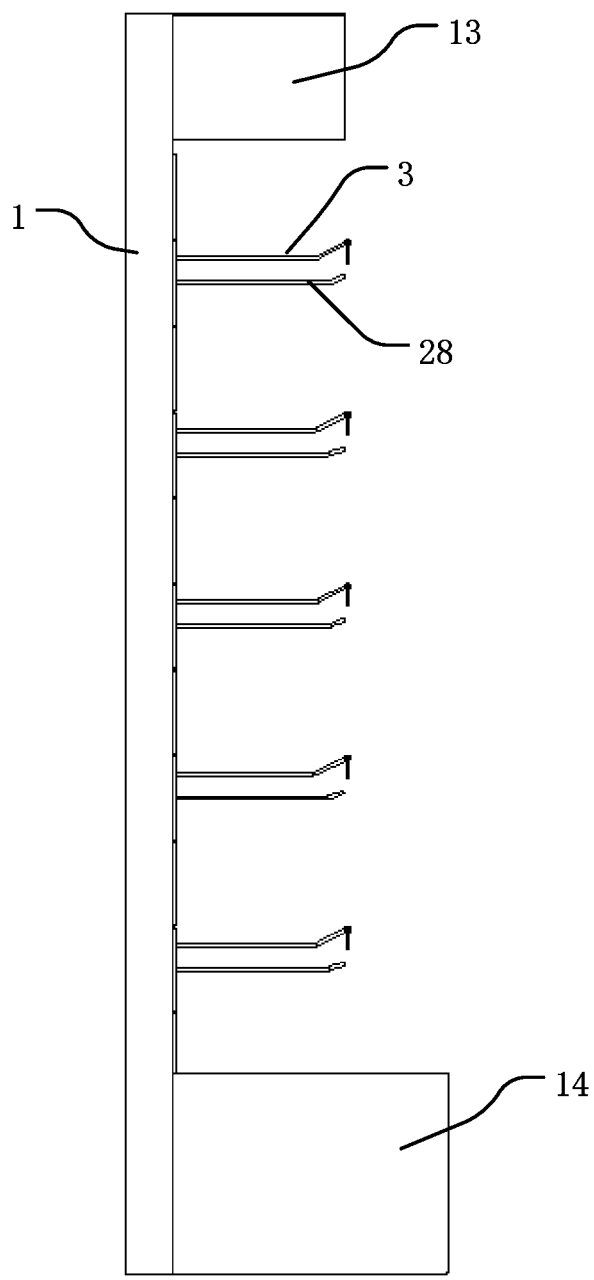
FIG. 2 is a side view of a shopping shelf according to an example of the disclosure.
Figure 3:
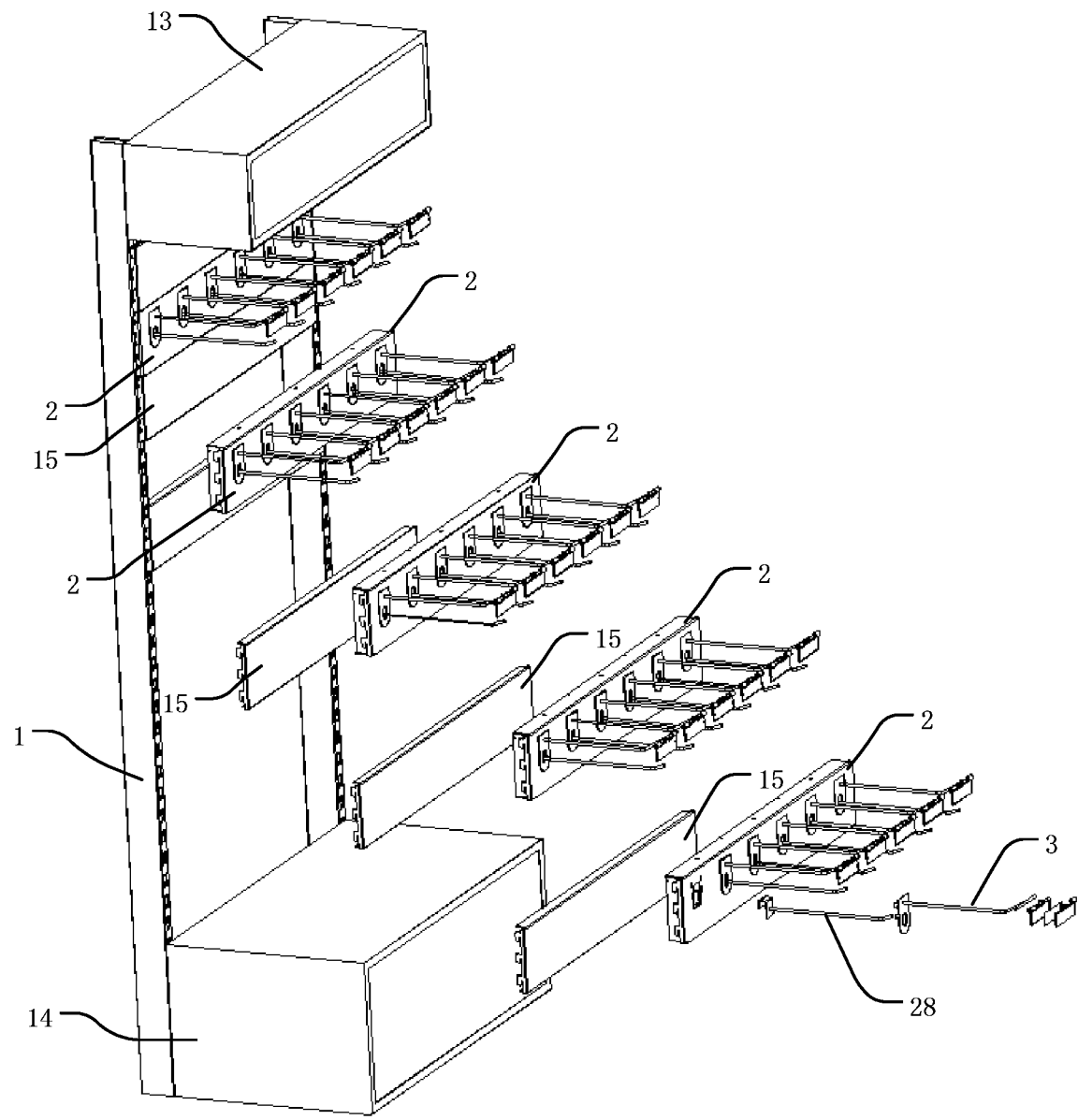
FIG. 3 is an exploded schematic view of a shopping shelf in one direction according to an example of the disclosure.
Figure 4:
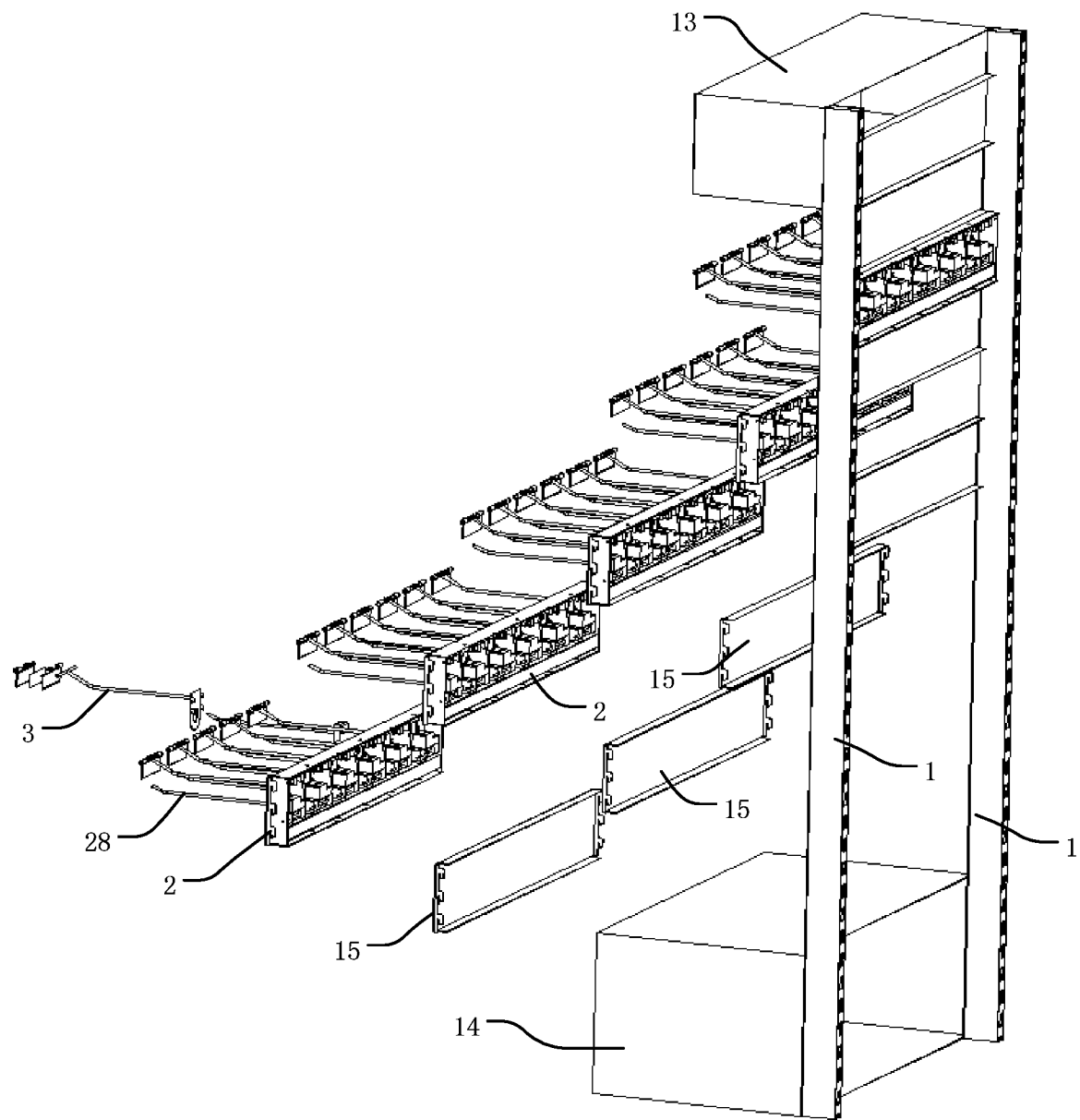
FIG. 4 is an exploded schematic view of a shopping shelf in another direction according to an example of the disclosure.

Referring to FIGS. 1 to 4, in this example, the shopping shelf, which may also be referred to as mounting hook frame, includes a shelf support 1 and at least a rack 2. FIG. 1 is a front schematic view of the whole shopping shelf. FIG. 2 is a side view of the shopping shelf. FIG. 3 is an exploded schematic view of the shopping shelf. FIG. 4 is an exploded schematic view of the shopping shelf in another direction. The rack 2 detachably mounts to the shelf support 1, and the rack 2 is provided with a suspension bracket 28 extending outwards for hanging the goods.

The shelf support 1 includes two rectilinear bracket bodies 11 that are set in parallel, and at least a bracket bayonet 12. The bracket body 11 is a rectangular cuboid set in vertical, and two bracket bodies 11 are parallel to each other. A side wall of each bracket body 11 is provided with at least one bracket bayonet 12 recessed in the side wall; when there are more than two bracket bayonets 12, a plurality of bracket bayonets 12 are evenly distributed along a straight line on a side wall of the bracket body 22. For example, the bracket bayonets 12 of two bracket bodies 11 are located on the same plane.

The shelf support 1 further includes a first connector 13 and a second connector 14; if necessary, the shelf support 1 further includes at least one connecting plate 15. Two ends of the first connector 13 are respectively detachably connected to the top ends of the two bracket bodies 11; and/or two ends of the second connector 14 are respectively detachably connected to the ends of the two bracket bodies 11; and/or the ends of each connecting plate 15 are respectively detachably connected to the two bracket bodies 11. The connecting plate 15 is provided in the gap between any two racks 2 arranged one above the other, or in the gap between one rack 2 and the first connector 13 or the second connector 14.

If a plurality of racks 2 are connected to each other, and a space between the two bracket bodies 11 can be filled, then there is no need to mount the connecting plate 15. In this case, the distance between the two rows of suspension brackets 28 on two adjacent racks 2 is small, and only the goods with small length can be hung on the suspension brackets 28. If the distance between two rows of adjacent suspension brackets 28 needs to be enlarged to hang goods with larger length on the suspension brackets 28, one or more connecting plates 15 are provided between two adjacent racks 2.

Figure 5:
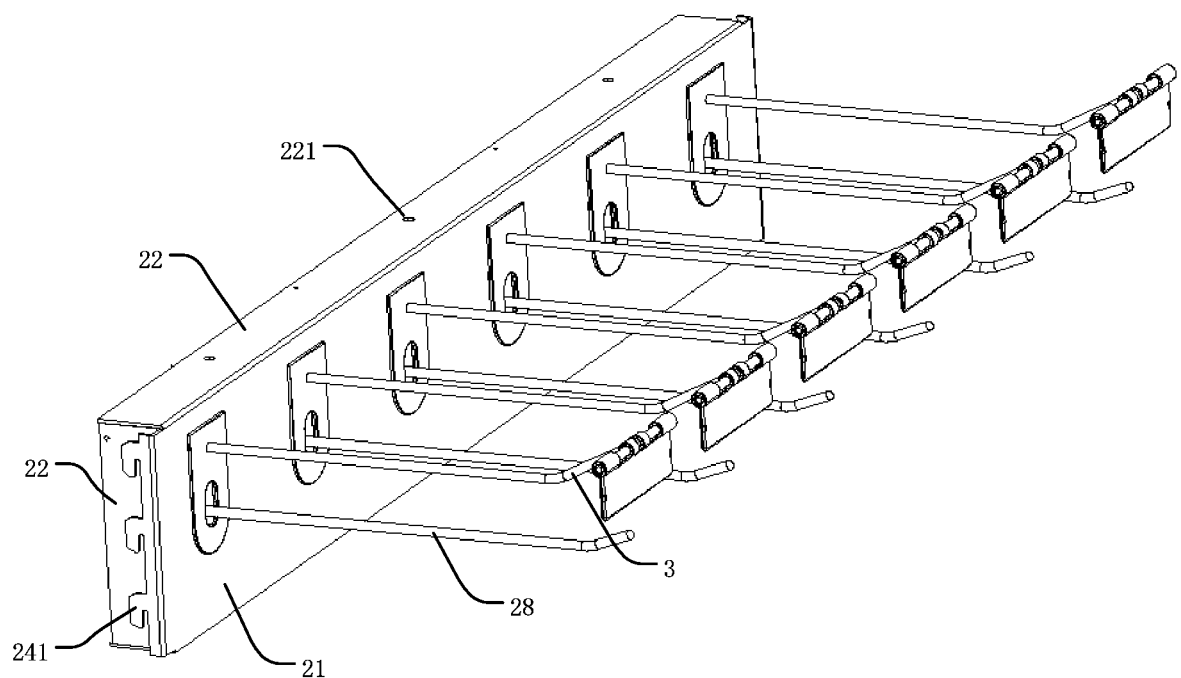
FIG. 5 is a schematic view of the structure of the front of the rack according to an example of the disclosure.
Figure 6:
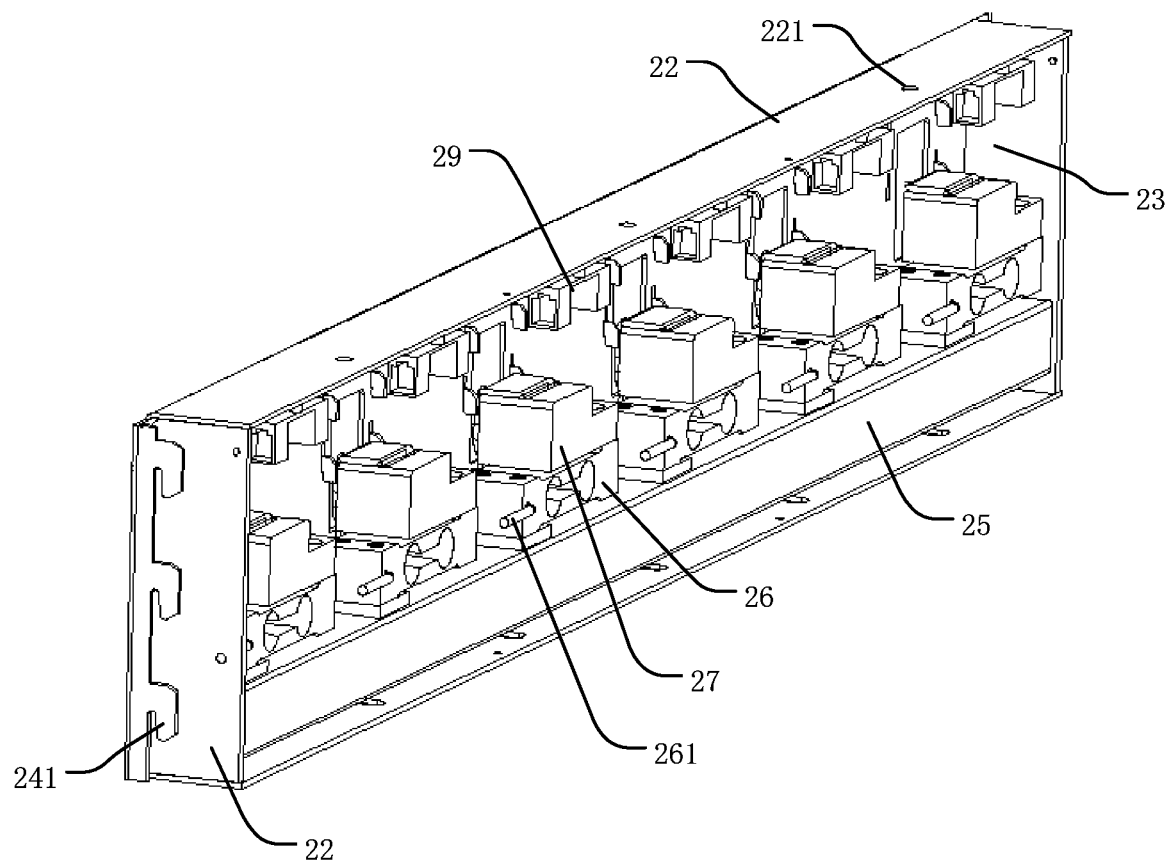
FIG. 6 is a schematic view of the structure of the back of the rack according to an example of the disclosure.

Referring to FIGS. 5 to 6, the rack 2 includes a vertical mounting plate 21, a baffle 22 and a mounting plate cavity 23. The vertical mounting plate 21 is perpendicular to the horizontal plane, and is detachably mounted to the shelf support 1.

The vertical mounting plate 21 is rectangular, and the edges of the four sides of the vertical mounting plate 21 are provided with protruding baffles 22. The baffle 22 is perpendicular to the vertical mounting plate 21, and four baffles 22 are located on the same side of the vertical mounting plate 21. One vertical mounting plate 21 and four baffles 22 enclose a mounting plate cavity 23.

The baffle 22 is provided with a plurality of baffle through holes 221, when a plurality of racks 2 are sequentially mounted between two shelf supports 1 from bottom to top, the baffle through holes 221 can be used to fixedly mount a plurality of racks 2 and a plurality of connecting plates 15 together.

The rack 2 further includes a clamping device 24 that is provided at the left or right edge of the vertical mounting plate 21. The clamping device 24 includes at least a clamping claw 241, and each clamping claw 241 is detachably clamped to one corresponding bracket bayonet 12.

FIG. 5 is a schematic view of the structure of the front of the rack. FIG. 6 is a schematic view of the structure of the back of the rack. Referring to FIGS. 5 to 6, the rack 2 further includes a mounting bracket 25, a weight sensing device 26, a suspension bracket base 27 and a suspension bracket 28.

The mounting bracket 25 is a rectilinear and rectangular member, and it is horizontally fixedly mounted into the mounting plate cavity 23. Two ends of the mounting bracket 25 are respectively connected to two opposite baffles 22 on the left and right sides.

The weight sensing device 26 is preferably a weight sensor and provided above the mounting bracket 25. The bottom surface of one end of the weight sensing device 26 is connected to the mounting bracket 25, a gasket 251 is provided between this bottom surface and the top of the mounting bracket 25, and there is a gap between the bottom of the other end of the weight sensing device 26 and the mounting bracket 25. In this example, the gasket 251 forms a fulcrum below the left end of the weight sensing device 26, and when the pressure on the middle or right side of the weight sensing device 26 changes, the weight sensing device 26 can accurately sense the magnitude of the pressure value changes. The suspension bracket base 27 is provided above the weight sensing device 26; specifically, the suspension bracket base 27 is above the middle and/or right side of the weight sensing device 26.

The suspension bracket base 27 is used to mount to the suspension bracket 28, and it includes a base body 271 and a bracket clamping slot 272. The bracket clamping slot 272 is rectilinear and is recessed on the top of the base body 271.

The rack 2 further includes a circuit board mounting slot 29 and a circuit board (not shown in figures). The circuit board mounting slot 29 is provided in the mounting board cavity 23, the circuit board is detachably mounted on the circuit board mounting slot 29, and a communication interface (not shown in figures) is provided on the circuit board mounting slot 29, which is connected to a data processing device 4 (preferably a server). The weight sensing device 26 is connected to the circuit board through a wire 261, and real-time sensing data is sent to the data processing device 4 through the communication interface.

At the rear of the two shelf supports 1, one or more covers (not shown in figures) are provided on the side opposite to the suspension bracket 28 to protect various components inside the rack 2. The covers are provided one or more cover through holes (not shown in figures), the positions of which correspond to the positions of the communication interfaces, and the data processing device 4 can be connected to each communication interface through the cover through holes through wires to facilitate the connection with various weight sensing devices 26, so the data processing device 4 may obtain the real-time weight sensing value from each weight sensing device 26 in real time.

Figure 7:
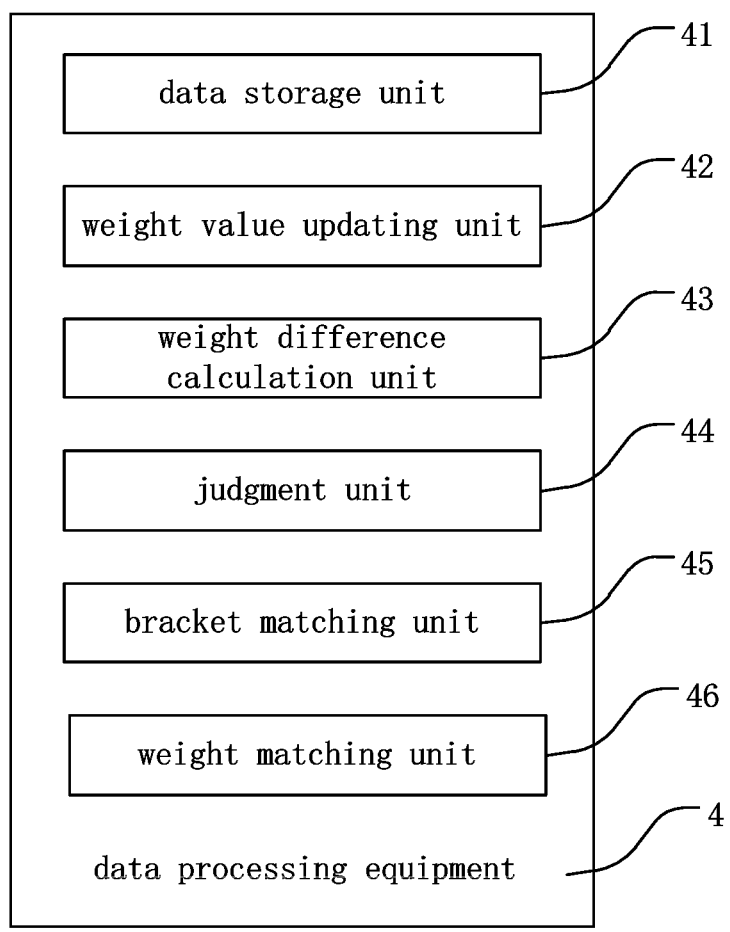
FIG. 7 is a block diagram of a data processing equipment according to an example of the disclosure.

FIG. 7 is a block diagram of a data processing equipment or a data processing device. Referring to FIG. 7, the data processing device 4 is preferably a computer or server, which includes a data storage unit 41, a weight value updating unit 42, a weight difference calculation unit 43, a judgment unit 44, a bracket matching unit 45, and a weight matching unit 46.

Figure 8:
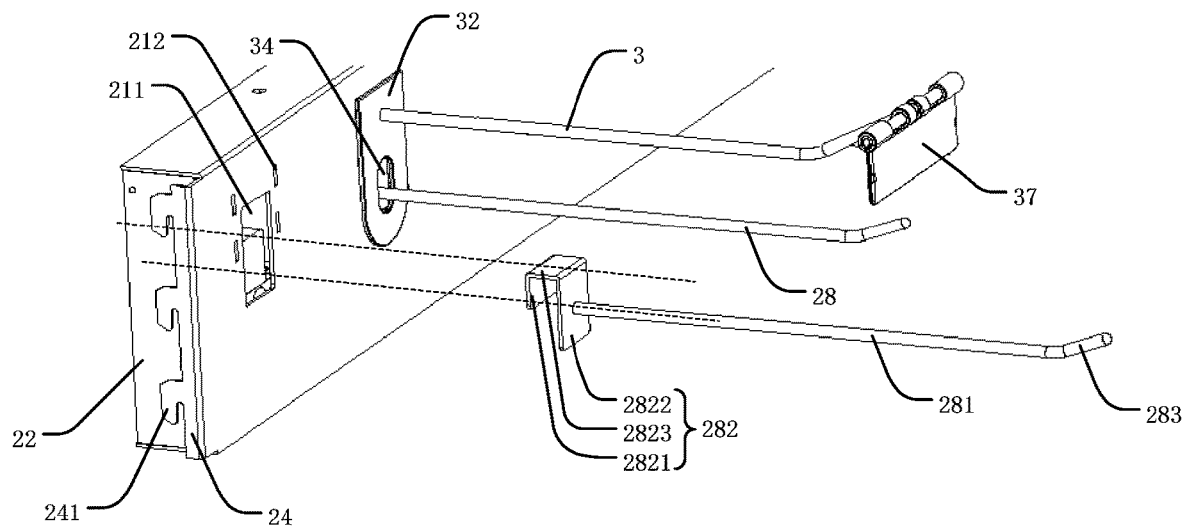
FIG. 8 is an exploded schematic view of a suspension bracket and a rack according to an example of the disclosure.

The data storage unit 41 is used to store the weight value of each item of goods and the corresponding suspension bracket number for each goods. The weight value updating unit 42 is used to store and update the real-time weight value of all products which located on each suspension bracket. In the initial state, all the suspension brackets are full of goods, and the weight value updating unit 42 stores the weight value of all the goods on each suspension bracket. When a user picks a certain item from a certain suspension bracket or returns a certain product on a certain suspension bracket, a weight sensing device obtains the real-time weight sensing values of all the goods on the suspension bracket at this time, and the weight difference calculation unit 43 calculates the weight difference value between this real-time weight value and the real-time weight value of all the goods on this suspension bracket stored in the weight value updating unit 42. The judgment unit 44 is used to determine the pick-or-place information change of the goods according to the weight difference value. When the weight difference value is less than 0, it is determined that the goods are taken away. When the weight difference value is less than 0, the bracket matching unit 45 is used to acquire the suspension bracket number corresponding to the weight sensor. The weight matching unit 46, based on the suspension bracket number, matches the absolute value of the weight difference value with the weight value of single item on the suspension bracket to determine the type and quantity of the removed goods. For example, four kinds of goods X, Y, Z and W are respectively hung on the four suspension brackets A, B, C, and D on the same rack, and the corresponding unit weight values are 50 grams, 80 grams, 100 grams, and 160 grams, respectively. When a user takes two items from the suspension bracket B, the weight sensing device corresponding to the suspension bracket B acquires the real-time weight sensing value, and the weight difference calculation unit 43 calculates the difference value between the real-time weight sensing value and the previous real-time weight value of the suspension bracket B which is 160 grams. The weight of single item corresponding to the suspension bracket B stored in the data storage unit 41 is 80 grams, and the weight matching unit 46 can calculate the quantity of the removed goods to be two. The data processing equipment 4 can record the position of the tray which is lighter than before as well as the changing time, and can acquire the shopping behavior of each user in real time. The shopping behavior refers to when, where, what quantity, and what kind of goods are taken away, and together with the user identification technology, it can confirm who, when, where, what quantity and what kind of goods are taken away, so that the shopping record of every user can be recorded in detail. When the user leaves the shopping area, automatic settlement for the user can be performed. Referring to FIG. 8, the vertical mounting plate 21 is provided with a mounting plate through hole 211 which penetrates the vertical mounting plate 21 and is arranged opposite to a suspension bracket base 27. The suspension bracket 28 includes a hanging rod 281 and a bracket buckle 282. The hanging rod 281 passes through the mounting plate through hole 211, one end of the hanging rod 281 is provided with the bracket buckle 282 which is detachably mounted to a suspension bracket base 27, the other end of the hanging rod 28 is bent upward to form a bending part 283, and the bending part 283 and the hanging rod 281 form an angle of 120-170 degrees. Many goods have a set of holes on the outer packaging (such as bagged goods), which can be placed on the suspension bracket 28 from the bending part 283. Since the bending part 283 is bent upward, the goods will slide to the hanging rod 281 without slipping.

The bracket buckle 282 includes a first card plate 2821, a second card plate 2822 and a connecting plate 2823. The first card plate 2821 can be inserted into the bracket clamping slot 272. The second card plate 2822 is parallel to the first card plate 2821. The hanging rod 281 is perpendicularly connected to the second card plate 2822. One end of the connecting plate 2823 is connected to the first card plate 2821, and the other end is connected to the second card plate 2822. When a bracket buckle 282 is mounted to a suspension bracket base 27, the first card plate 2821 is inserted into the bracket clamping slot 272, and a side of the second card plate 2822 is tangent to a side of the base body 271. The depth of the bracket clamping slot 272 is greater than 1 centimeter, which is generally about 60-90% of the thickness of the suspension bracket base 27 to ensure that the suspension bracket 28 can be mounted stably.

Figure 9:
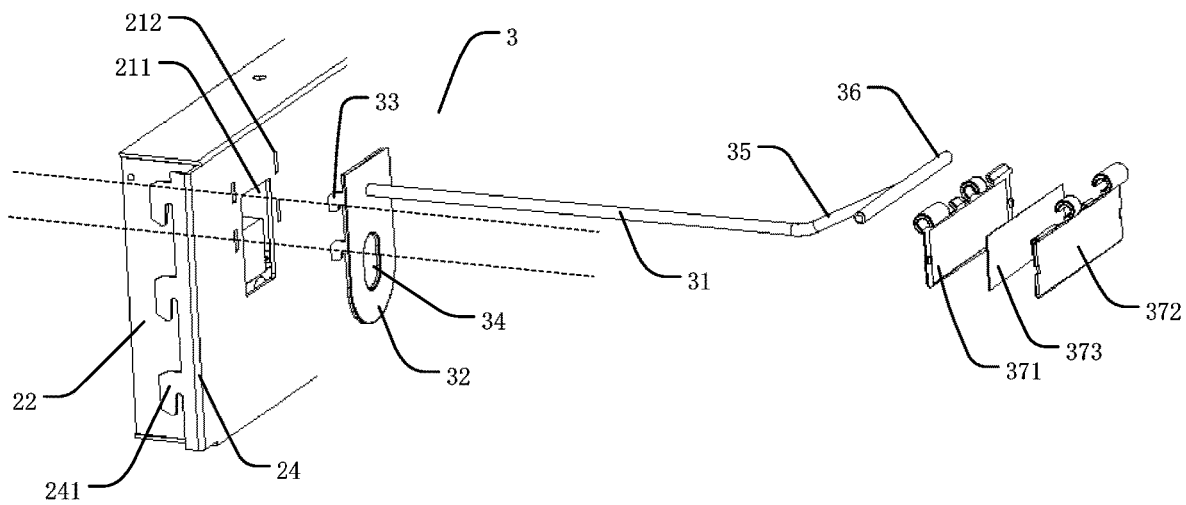
FIG. 9 is an exploded schematic view of a second suspension bracket and a rack according to an example of the disclosure.

Referring to FIGS. 8 to 9, the vertical mounting plate 21 is provided with a mounting plate bayonet 212 that penetrates the vertical mounting plate 212 and is located around the mounting plate through hole 211.

In this example, the mounting hook frame further includes a second suspension bracket 3, which is detachably mounted to the vertical mounting plate 21. The second suspension bracket 3 includes a second hanging rod 31, a second baffle 32, a second bracket buckle 33 and a second baffle through hole 34.

The second baffle 32 is disposed at one end of the s second hanging rod 31 and is opposite to a mounting plate through hole 211. The second bracket buckle 33 protrudes from the second baffle 32 toward a side surface of the mounting plate through hole 211, and is detachably engaged onto the mounting plate bayonet 212. The second baffle through hole 34 penetrates through the second baffle 32. When the second bracket buckle 33 is engaged in the mounting plate bayonet 212, the second baffle 32 blocks the mounting plate through hole 211, and the hanging rod 281 of the suspension bracket 28 passes through the second baffle through hole 34.

One end of the second hanging rod 31 is perpendicularly connected to the second baffle 32, and the other end thereof is bent upward to form a second bending part 35, which forms an angle of 120-170 degrees with the second hanging rod 31.

FIG. 8 is an exploded schematic view of the suspension bracket and the rack. FIG. 9 is an exploded schematic view of the second suspension bracket and the rack. Referring to FIGS. 8 to 9, the second suspension bracket 3 further includes a cross-bar 36 and an identification board 37. The cross-bar 36 is perpendicularly connected to the end of the second hanging rod 31 which is far away from the second baffle 32, that is, the end of the second bending part 35. The identification board 37 is rotatably or fixedly mounted to the cross-bar 36. The identification board 37 includes a first rotary plate 371 and a second rotary plate 372 that are detachably assembled into one body. The first rotary plate 371 and the second rotary plate 372 can rotate around the cross-bar 36 by a certain angle after being assembled. The first rotary plate 371 and the second rotary plate 372 are made of transparent materials. A replaceable label 373 is provided between the first rotary plate 371 and the second rotary plate 372, and the product name, type, model, origin, unit price and other information are written on the label 373.

Every second suspension bracket 3 corresponds to a suspension bracket 28, which is generally located above the suspension bracket 28, and the identification board 37 can be affixed with a product logo, so the user can acquire the corresponding goods information of the suspension bracket 28.

In this example, each rack 2 is provided with a vertical mounting plate 21 and a mounting bracket 25. The same vertical mounting plate 21 is provided with a plurality of mounting plate through holes 211 (generally 3-8, preferably 4 or 6). A plurality of weight sensing devices 26 are provided on the same mounting bracket 24, a suspension bracket base 27 is provided above each weight sensing device 26, each suspension bracket base 27 is provided with a suspension bracket 28 that passes a mounting plate through hole 211, and a second hanging bracket 3 is mounted at each mounting plate through hole 211. The mounting plate through hole 211, the weight sensing device 26, suspension bracket base 27, the suspension bracket 28 and the second suspension bracket 3 are all in a one-to-one correspondence.

In this example, the same type of goods with the same or similar weight is hung on each suspension bracket. When a user takes or puts back the goods, the total weight of the goods suspended on each suspension bracket 28 will change, the weight sensing device 26 can acquire the real-time weight sensing value of the goods on each suspension bracket 28, and the data processing device determines the quantity change of the goods on each suspension bracket. In this example, the method and principle of goods identification of the mounting hook frame will be described as following.

Firstly, a bracket number is set for each rack and each suspension bracket, and the same type of goods of the same or similar weight are hung on each suspension bracket. In this way, all products on the same suspension bracket can be distinguished according to weight, and the identification information corresponding to each goods is established in a one-to-one correspondence with the product information. The product information of the goods includes the product name of the goods, product number, price, manufacturer, etc. The identification information of the goods includes the weight value of the goods, the number of the suspension bracket to which it belongs, etc. The identification information and the product information corresponding to each goods, and the corresponding relationship are stored in the data processing device 4.

Secondly, each weight sensing device 26 (such as weight sensor) collects the weight sensing value of each suspension bracket 28 in real time. The data collection interval is 0.1-0.4 seconds, and preferably 0.3 seconds. The real-time weight value collected by each weight-sensing device 26 is sent to the data processing device 4, and after being compared with the previous real-time weight value collected by the weight sensing device 26, it is stored in the data processing device 4 to complete the data update and overwriting.

Finally, in this example, during each data collection process, there are six weight sensing devices 26 simultaneously acquire six pieces of data, respectively compared with the last six pieces of data pre-stored in the data processing device 4. The last six pieces of data are the weight values collected by the six gravity sensors at previous time. In the comparison process, the weight difference value between the newly real-time weight value and the last moment real-time weight value from each weight-sensing device 26 is acquired, and if all the weight difference values are 0, the data processing device 4 does not need other operations, and the weight sensing device 26 needs to collect a new weight difference value again.

If the weight difference value corresponding to a certain gravity sensor is less than 0, it can be determined that the goods on the suspension bracket corresponding to the gravity sensor have been taken away, and the data processing device 4 acquires the bracket number of the suspension bracket. According to the bracket number, the absolute value of the weight difference is matched with the known weight value of each goods on the suspension bracket to determine the type of the removed goods. In this example, the gravity sensor measures accurately, and the weight value can be accurate to gram, but the weight of the goods itself may have errors. So in general, when the difference between the absolute value of the weight difference and the weight value of a certain goods range between −4 grams to 4 grams, it can be considered there is a successful match, and thus the data processing device 4 can determine which goods was taken.

Further, this example may be used in combination with a shopping application software (APP) of a mobile phone, the data processing device 4 achieves data exchange with the mobile phone of a user through wireless communication (such as WIFI or cellular communication or Bluetooth), and the goods is automatically added to the shopping cart of the shopping software in the mobile of the user for later settlement.

The disclosure provides a mounting hook frame, including: a shelf support; and a rack detachably mounted to the shelf support; where the rack includes: a mounting bracket; a weight sensing device above the mounting bracket; a suspension bracket base above the weight sensing device; and a suspension bracket having one end detachably mounted to the suspension bracket base.

In some examples, the rack further includes: a vertical mounting plate; a baffle protruding from an edge of the vertical mounting plate; and a mounting plate cavity surrounded by the vertical mounting plate and the baffle.

In some examples, the rack further includes: a mounting plate through hole that penetrates through the vertical mounting plate and is opposite to the suspension bracket base; where one end of the suspension bracket is detachably mounted to the suspension bracket base through the mounting plate through hole.

In some examples, the rack further includes: a mounting plate bayonet that penetrates through the vertical mounting plate and is located around the mounting plate through hole.

In some examples, the rack further includes: a circuit board mounting slot in the mounting plate cavity; and a circuit board detachably mounted in the circuit board mounting slot; where the circuit board is provided with a communication interface and is connected to a data processing device (or a server); the weight sensing device is connected to the circuit board by a wire, and real-time sensing data is sent to the data processing device through the communication interface.

In some examples, the mounting bracket is fixedly mounted into the mounting plate cavity; and both ends of the mounting bracket are connected to two opposite baffles, respectively.

In some examples, a bottom surface of one end of the weight sensing device is connected to the mounting bracket, and a gap exists between a bottom surface of the other end of the weight sensing device and the mounting bracket.

In some examples, the rack further includes: a gasket between the bottom surface of one end of the weight sensing device and a top surface of the mounting bracket.

In some examples, the suspension bracket base includes: a base body; and a bracket clamping slot recessed on a top of the base body; where the suspension bracket includes: a hanging rod; and a bracket buckle at one end of the hanging rod and detachably engaged to the bracket clamping slot.

In some examples, the bracket buckle includes: a first card plate inserted into the bracket clamping slot; a second card plate that is parallel to the first card plate and fixedly coupled to the hanging rod; and a connecting plate having one end connected to the first card plate and the other end connected to the second card plate.

In some examples, the mounting hook frame further includes: a second suspension bracket detachably engaged to the vertical mounting plate.

In some examples, the mounting hook frame further includes: a second suspension bracket detachably mounted to the vertical mounting plate; where the second suspension bracket includes: a second hanging rod; a second baffle disposed at one end of the second hanging rod and opposite to the mounting plate through hole; a second racket buckle protruding from a surface of the second baffle toward a side of the mounting plate through hole, and detachably engaged to the mounting plate bayonet; and a second baffle through hole penetrating the second baffle; when the second racket buckle snap fits into the mounting plate bayonet, the hanging rod of the suspension bracket passes through the second baffle through hole.

In some examples, the second suspension bracket further includes: a cross-bar perpendicularly connected to one end of the second hanging rod that is far away from the second baffle; and an identification board that is rotatably or fixedly mounted to the cross-bar.

In some examples, the shelf support further includes: a bracket body that is a rectangular cuboid set in vertical; and at least one bracket bayonet recessed and evenly distributed on a side wall of the bracket body; where the rack includes:

at least one clamping claw at one end edge of the vertical mounting plate and detachably clamped to the bracket bayonet.

In some examples, the shelf support further includes: a first connector having two ends detachably connected to top ends of two bracket bodies, respectively; and/or a second connector having two ends detachably connected to lower ends of the two bracket bodies, respectively; and/or at least one connecting plate, each having two ends detachably connected to the two bracket bodies, respectively.

The present disclosure provides a mounting hook frame, which can accurately identify the weight of all the goods hanging on the shelf, and judge, according to the change of the weight, whether the goods are removed from the shelf, thereby solving the technical problems of poor accuracy, large errors and loss of goods.

The disclosure provides a mounting hook frame capable of sensing goods, having the weight sensing function of the goods, which can monitor the real-time weight sensing value of the goods on the shelf in real time, sense the weight change of each suspension bracket in real time, and the data processing equipment can infer what type of goods has been taken away or put back according to the weight change of all suspension brackets on the shelf. The data processing equipment can further determine the type and quantity of the goods that are taken or put back according to the weight value of each item of goods and the bracket number of the suspension bracket. The data processing device can further determine the identity of a user who takes away or puts back the goods according to the real-time location of the user and the hanging location of each goods pre-stored in the data processing device. Compared with traditional flat-type shelves, on one hand, the mounting hook frame of the disclosure may hang more kinds of goods in the same size space, improve space utilization, and is suitable for various goods with smaller sizes; on the other hand, it allows users to take goods more conveniently and faster, giving a better experience for users.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

The invention claimed is:

1. A shopping shelf, comprises:
   a shelf support; and
   a rack detachably mounted to the shelf support;
   wherein the rack comprises:
   a mounting bracket;
   a weight sensing device above the mounting bracket;
   a suspension bracket base above the weight sensing device; and
   a suspension bracket having one end detachably mounted to the suspension bracket base.

2. The shopping shelf according to claim 1, wherein the rack further comprises:
   a vertical mounting plate;
   a baffle protruding from an edge of the vertical mounting plate; and
   a mounting plate cavity surrounded by the vertical mounting plate and the baffle.

3. The shopping shelf according to claim 2, wherein the rack further comprises:
   a mounting plate through hole that penetrates through the vertical mounting plate and is opposite to the suspension bracket base; wherein one end of the suspension bracket is detachably mounted to the suspension bracket base through the mounting plate through hole.

4. The shopping shelf according to claim 3, wherein the rack further comprises:
   a mounting plate bayonet that penetrates through the vertical mounting plate and is located around the mounting plate through hole.

5. The shopping shelf according to claim 2, wherein the rack further comprises:
   a circuit board mounting slot in the mounting plate cavity; and
   a circuit board detachably mounted in the circuit board mounting slot; wherein the circuit board is provided with a communication interface and is connected to a data processing device;
   wherein the weight sensing device is connected to the circuit board by a wire, and real-time sensing data is sent to the data processing device through the communication interface.

6. The shopping shelf according to claim 2, wherein the mounting bracket is fixedly mounted into the mounting plate cavity; and both ends of the mounting bracket are connected to two opposite baffles, respectively.

7. The shopping shelf according to claim 1, wherein a bottom surface of one end of the weight sensing device is connected to the mounting bracket, and a gap exists between a bottom surface of another end of the weight sensing device and the mounting bracket.

8. The shopping shelf according to claim 7, wherein the rack further comprises:
   a gasket between the bottom surface of one end of the weight sensing device and a top surface of the mounting bracket.

9. The shopping shelf according to claim 1, wherein the suspension bracket base comprises:
   a base body; and
   a bracket clamping slot recessed on a top of the base body;
   wherein the suspension bracket comprises:
   a hanging rod; and
   a bracket buckle at one end of the hanging rod, and detachably engaged to the bracket clamping slot.

10. The shopping shelf according to claim 9, wherein the bracket buckle comprises:
    a first card plate inserted into the bracket clamping slot;
    a second card plate that is parallel to the first card plate and fixedly coupled to the hanging rod; and
    a connecting plate having one end connected to the first card plate and another end connected to the second card plate.

11. The shopping shelf according to claim 2, further comprises:
    a second suspension bracket detachably engaged to the vertical mounting plate.

12. The shopping shelf according to claim 4, further comprises:

a second suspension bracket detachably mounted to the vertical mounting plate;
wherein the second suspension bracket comprises:
a second hanging rod;
a second baffle at one end of the second hanging rod and opposite to the mounting plate through hole;
a second racket buckle protruding from a surface of the second baffle toward a side of the mounting plate through hole, and detachably engaged to the mounting plate bayonet; and
a second baffle through hole penetrating the second baffle; wherein when the second racket buckle snap fits into the mounting plate bayonet, the hanging rod of the suspension bracket passes through the second baffle through hole.

13. The shopping shelf according to claim 12, wherein the second suspension bracket further comprises:
a cross-bar perpendicularly connected to one end of the second hanging rod that is far away from the second baffle; and
an identification board that is rotatably or fixedly mounted to the cross-bar.

14. The shopping shelf according to claim 2, wherein the shelf support further comprises:
a bracket body that is a rectangular cuboid set in vertical; and
at least one bracket bayonet recessed and evenly distributed on a side wall of the bracket body;
wherein the rack comprises:
at least one clamping claw at one end edge of the vertical mounting plate and detachably clamped to the bracket bayonet.

15. The shopping shelf according to claim 14, wherein the shelf support further comprises:
a first connector having two ends detachably connected to top ends of two bracket bodies, respectively;
a second connector having two ends detachably connected to lower ends of the two bracket bodies, respectively; or
at least one connecting plate, having two ends detachably connected to the two bracket bodies, respectively.

* * * * *